Patented Mar. 15, 1927.

1,621,195

UNITED STATES PATENT OFFICE.

OTTO ERNST AND OTTO NICODEMUS, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY.

PROCESS FOR PREPARING A HIGHLY-ACTIVE CHARCOAL.

No Drawing. Application filed July 9, 1923, Serial No. 650,541, and in Germany July 15, 1922.

It is known that highly active charcoal can be produced by heating carbon containing substances until carbonization takes place in the presence of acids of phosphorus. Now we have found that this carbonization may be effected in the presence of air, appropriately in a revolving furnace provided for internal heating, and it is advantageously effected in the presence of so much air that the gases leaving the furnace contain oxygen. It was surprising that no ignition of the carbon containing substance could be observed in the course of the carbonization, because in all processes known up till now this was always the case, and consequently it was regarded as necessary to work either in an indifferent or in a reducing gas current. Our process, on the contrary, renders it possible to carbonize in a revolving furnace suitably lined with resisting material and provided for internal heating (without any precautions for preventing the entrance of air, or the presence of an excess of oxygen in the combustion and heating gases) carbonaceous substances, such as for instance wood, turf, straw, brown-coal or mixtures of two or several of such substances after having soaked or impregnated them with acids of phosphorus or such compounds as decompose into acids of phosphorus when heated to the carbonizing temperature or exposed to moisture. Thus it is possible to obtain a highly active charcoal. The presence of oxygen is even of advantage because the reduction of the acids of phosphorus to yellow phosphorus and phosphoretted hydrogen is thereby prevented, and thus a loss of phosphoric acids in the form of the above mentioned volatile and easily deflagrating bodies is prevented.

Having now described our invention, what we claim is:

1. In processes for the production of highly active charcoal involving the carbonization of carbonaceous material in the presence of an acid of phosphorus the step which consists in carbonizing the impregnated carbonaceous material in the presence of a gas containing free oxygen in quantity sufficient to substantially prevent reduction of the acid of phosphorus.

2. In the process for the production of highly active charcoal by heating carbonaceous material impregnated with an acid of phosphorus the steps which consist in heating the material in an internally heated revolving furnace and passing gases containing oxygen therethrough, said gases containing sufficient oxygen that the gases leaving the furnace contain oxygen.

3. As a new product highly active charcoal substantially identical with highly active charcoal prepared by the hereindescribed process which comprises carbonizing carbonaceous material in the presence of an acid of phosphorus and a gas containing free oxygen in quantity sufficient to substantially prevent reduction of the acid of phosphorus.

4. As a new product highly active charcoal such as may be prepared by the herein described process which comprises heating carbonaceous material impregnated with an acid of phosphorus in a revolving internally heated furnace and passing oxygen-containing gases therethrough, said gases containing sufficient oxygen that the gases leaving the furnace contain oxygen.

5. In processes for the production of highly active charcoal by the carbonization of carbonaceous material in the presence of an acid of phosphorus the step which consists in completing the carbonization in a revolving furnace in the presence of a current of a heating gas containing free atmospheric oxygen.

In testimony whereof, we affix our signatures.

Dr. OTTO ERNST. [L. S.]
Dr. OTTO NICODEMUS. [L. S.]